(12) United States Patent
Meline et al.

(10) Patent No.: US 11,088,529 B2
(45) Date of Patent: Aug. 10, 2021

(54) DEVICE AND IMPROVED METHOD FOR PROTECTING AGAINST LIGHTNING FOR A DIFFERENTIAL INPUT

(71) Applicant: SAFRAN ELECTRONICS & DEFENSE, Boulogne-Billancourt (FR)

(72) Inventors: Olivier Meline, Boulogne-Billancourt (FR); Mathieu Le-Meunier, Boulogne-Billancourt (FR)

(73) Assignee: Safran Electronics & Defense, Boulogne-Billancourt (FR)

( * ) Notice: Subject to any disclaimer, the term of this patent is extended or adjusted under 35 U.S.C. 154(b) by 0 days.

(21) Appl. No.: 16/761,434

(22) PCT Filed: Nov. 2, 2018

(86) PCT No.: PCT/EP2018/080048
§ 371 (c)(1),
(2) Date: May 4, 2020

(87) PCT Pub. No.: WO2019/086625
PCT Pub. Date: May 9, 2019

(65) Prior Publication Data
US 2020/0381912 A1 Dec. 3, 2020

(30) Foreign Application Priority Data
Nov. 3, 2017 (FR) ..................................... 17 60358

(51) Int. Cl.
*H02H 1/04* (2006.01)
*G01D 5/22* (2006.01)
(52) U.S. Cl.
CPC ............. *H02H 1/04* (2013.01); *G01D 5/2291* (2013.01)

(58) Field of Classification Search
CPC ............................... H02H 1/04; G01D 5/2291
See application file for complete search history.

(56) References Cited

U.S. PATENT DOCUMENTS

2011/0279935 A1* 11/2011 Iwasa ................... H03H 7/0107
361/56
2014/0145737 A1* 5/2014 Lacombe ............. G01R 35/005
324/713

FOREIGN PATENT DOCUMENTS

CN         203759090 U     8/2014

OTHER PUBLICATIONS

Machine Translation of Jia Bing Chinese Patent Document CN 203759090 U Aug. 2014 (Year: 2014).*

(Continued)

*Primary Examiner* — Thienvu V Tran
*Assistant Examiner* — Bart Iliya
(74) *Attorney, Agent, or Firm* — Muncy, Geissler, Olds & Lowe, P.C.

(57) ABSTRACT

A device for acquiring signals from a sensor, the device comprising a differential amplifier, two bias resistors for biasing of the measurement device, a common mode and differential mode filter circuit, and two lightning limiter components. The differential amplifier is of the high common mode range type, the limiter components are dimensioned to reduce a lightning voltage to a maximum voltage value of the order of about one hundred volts and the filter circuit and the bias resistors are dimensioned to withstand that maximum voltage value. A correspond method for protecting a device against lightning.

7 Claims, 1 Drawing Sheet

(56) References Cited

OTHER PUBLICATIONS www.analog.com/inamps: "A Designer's Guide to Instrumentation Amplifiers 3 rd Edition", Dec. 31, 2006, XP055173156, Retrieved from the Internet: URL:http://www.analog.com/media/en/training-seminars/design-handbooks/58127566743127787737Complete_In_Amp.pdf , pp. 1.1, 1.5-1.6, 4.1, 4.6, 5.2-5.15, 6.6, 6.12 and 6.17.

\* cited by examiner

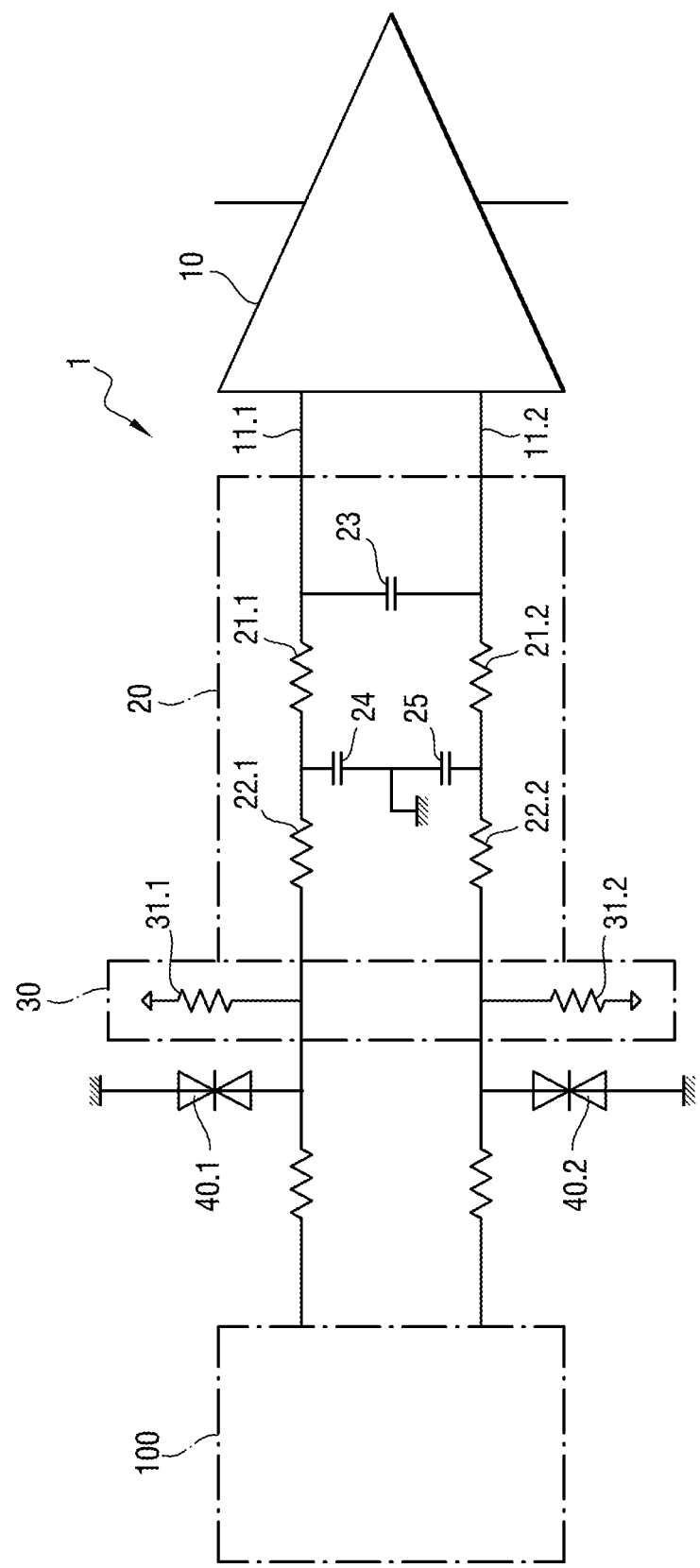

DEVICE AND IMPROVED METHOD FOR PROTECTING AGAINST LIGHTNING FOR A DIFFERENTIAL INPUT

The present invention relates to the field of measurement sensors, and more precisely to the acquisition of signals coming from a sensor. By way of example, the sensor may be a movement sensor such as a passive sensor of the linear variable differential transformer (LVDT) type.

STATE OF THE ART

A device for acquiring signals from a sensor generally comprises:
- a standard differential amplifier having a first input connected to a first line and a second input connected to a second line, the first line and the second line each being for connection to a respective output of the sensor;
- a common mode and differential mode filter circuit connected to the first line and to the second line; and
- two bias resistors for biasing the sensor and connected respectively to the first line and to the second line.

The signals delivered by sensors generally comprise a voltage in the range a few millivolts to a few volts, and the differential amplifier used is a standard amplifier adapted to process signals corresponding to those voltages. For applications in which the sensor runs the risk of being struck by lightning, there presently exist two solutions for limiting the risk of lightning causing the acquisition device to fail.

The first solution consists in dimensioning the components of the filter circuit so that they can withstand the lightning wave, filter it, and limit the voltage and the current at the input to the amplifier to levels that it can withstand, namely a few volts or tens of volts, and a few milliamps. The filter circuit then comprises impedances of several tens of kilohms in order to reduce the input current of the amplifier. Because of those high impedances, the wiring and of the components of the circuit present stray capacitances that are no longer negligible, and any asymmetry between the two lines in the values of those stray capacitances give rise to significant degradation in the characteristics of the circuit concerning rejection of common mode disturbances. Furthermore, the filter cut-off frequencies needed for attenuating lightning waves can often be difficult to reconcile with operational needs. Furthermore, the components of the filter circuit are dimensioned for high voltages, which increases considerably both their cost and also the area they occupy.

The second solution consists in connecting each of the lines, upstream from the bias resistors, to voltage limiter components capable of maintaining the voltage at the input of the filter circuit to a maximum voltage of the order of a few volts to a few tens of volts. By way of example, the limiter components may be transient voltage suppressor diodes of the Transil type that absorb the excess current in order to lower the voltage. The components used for the filter circuit are then standard components that are inexpensive and that disturb acquisition relatively little. In contrast, because of their leakage currents and their stray capacitances, the limiter components degrade the accuracy of acquisition, disturb the detection of failures, degrade the common mode rejection ratio if impedances are formed upstream, and degrade the input impedance (as a result of leakage currents with direct current (DC) and of stray capacitances with alternating current (AC)). Finally, the stray capacitances of those limiter components can give rise to generally unacceptable resonances in the measurement circuit if the sensor presents an impedance that is inductive.

The second solution is described in particular in Document "A Designer's Guide to Instrumentation Amplifiers", Charles Kitchin and Lew Counts, 3rd Edition, Analog Devices, www.analog.com/inamps, which includes a chapter about protecting acquisition circuits that comprise a differential amplifier.

OBJECT OF THE INVENTION

An object of the invention is to provide means for protecting measurement acquisition devices against lightning without degrading their performance.

BRIEF SUMMARY OF THE INVENTION

To this end, the invention provides a device for acquiring signals from a sensor, the device comprising:
- a differential amplifier having a first input connected to a first line and a second input connected to a second line, the first line and the second line each being for connection to a respective output of the sensor;
- two bias resistors for biasing the measurement device and connected respectively to the first line and to the second line;
- a common mode and differential mode filter circuit connected to the first line and to the second line; and
- two lightning limiter components connected respectively to the first line and to the second line.

The differential amplifier is of the "high common mode range" type that accepts input voltages of several hundred volts, generally lying approximately in the range 100 volts to 500 volts, depending on the manufacturer and the model. Such an operational amplifier is selected in such a manner that the limiter components are dimensioned to limit the lightning voltage to that maximum value. The filter circuit and the bias resistors are dimensioned to withstand the maximum value of the limited voltage. Although, given the voltages to be measured and the voltages that are input to the circuit, it is possible to select a differential amplifier of conventional type, in the invention, an amplifier of the "high common mode range" type is selected in order to limit the amount of voltage limiting that is necessary in the event of a lightning strike. Specifically, by departing from the traditional use of an amplifier of "high common mode range" type, an acquisition circuit of the type that might be struck by lightning is created in which it is possible for a maximum voltage of the order of about one hundred volts to be acceptable at the input of the amplifier, thus making it possible to reduce the quantity of energy that is dissipated during voltage limiting, thereby reducing the power of the voltage limiting. Indirectly, this also has a beneficial influence on the stray interference values due to the voltage limiters. Specifically, the stray capacitance and the leakage currents of the limiter components are proportional to the power of the limiter components and inversely proportional to the limit voltage of the limiter components. By increasing the limit voltage and by reducing the power of the limiter components, it is possible to reduce those stray capacitances and currents to values that are low and do not further degrade the performance of the circuit. The impedances and the common mode and differential mode filter characteristics are not impacted by the presence of the limiter components.

The invention also provides a method of providing lightning protection for a device for acquiring signals from a sensor, the device comprising a first line and a second line, each for connection to a respective output of the sensor, two bias resistors for biasing the measurement device and two lightning limiter components connected respectively to the first line and to the second line, and a common mode and differential mode filter circuit connected to the first line and to the second line. The method comprises the steps of:

- instead of and replacing a conventional differential amplifier, using a differential amplifier of "high common mode range" type, connecting a first input of the differential amplifier to the first line and a second input to the second line; and
- dimensioning the limiter components to reduce a lightning voltage to a maximum voltage value of about one hundred to three hundred volts, and dimensioning the filter circuit and the bias resistors to withstand that maximum voltage value.

Other characteristics and advantages of the invention appear on reading the following description of particular, nonlimiting embodiments of the invention.

BRIEF DESCRIPTION OF THE FIGURES

Reference is made to the sole accompanying FIGURE, which is a schematic diagram of the acquisition device of the invention.

DETAILED DESCRIPTION OF THE INVENTION

With reference to the FIGURE, the device 1 for acquiring signals from a sensor 100 comprises a differential amplifier 10, a filter circuit 20, a bias circuit 30, and a protection circuit 40.

The differential amplifier 10 has a first input connected to a first line 11.1 and a second input connected to a second line 11.2. The first line 11.1 connects a first output of the sensor 100 to the first input of the amplifier 10, and the second line connects a second output of the sensor 100 to the second input of the amplifier 10.

The amplifier 10 is of the "high common mode range" type.

The filter circuit 20 is arranged to provide filtering in common mode and in differential mode in order to reduce high-frequency disturbances without degrading the accuracy of measurements in the useful band. The filter circuit 20 comprises:

- on each of the first line 11.1 and the second line 11.2, a first resistor 21.1, 21.2 connected firstly to the amplifier 10 and secondly a second resistor 22.1, 22.2 that is connected to a respective input of the acquisition device 1;
- a first capacitor 23 connecting the first line 11.1 to the second line 11.2 between the first resistor 21.1, 21.2 and the amplifier 10; and
- a second capacitor 24 having a first terminal connected to the first line 11.1 between the first resistor 21.1 and the second resistor 22.1, and a second terminal connected to a first terminal of a third capacitor 25 having a second terminal connected to the second line 11.2 between the first resistor 21.2 and the second resistor 22.2.

The second terminal of the second capacitor 24 and the first terminal of the third capacitor 25 are connected together to ground.

The bias member 30 comprises a bias resistor 31.1 connecting the first line 11.1 to ground upstream from the second resistor 22.1, and a bias resistor 31.2 connecting the second line to ground upstream from the second resistor 22.2.

The protection circuit 40 comprises:

- a lightning limiter component 40.1 connecting the first line 11.1 to ground between the bias member 30 and the sensor 100; and
- a lightning limiter component 40.2 connecting the second line 11.2 to ground between the bias member 30 and the sensor 100.

By way of example, the limiter components 40.1, 40.2 may be transient voltage suppressor diodes of the Transil type that absorb the excess current in order to lower the voltage. The components 40.1, 40.2 are dimensioned to limit the lightning voltage to a value that is just sufficient to comply with the maximum voltage is that can be withstood by the "high common mode range" amplifier and by the filter and bias components of the circuit, i.e. to about one hundred to three hundred volts, depending on the components used. Limiting to lower voltages would not make it possible to benefit from the reduction in the values of the stray capacitances and currents obtained for the limiter components. Limiting to higher voltages would require the filter components to be over-dimensioned, but without benefiting from any meaningful additional reduction in those stray interference values.

The invention are thus also relates to a method of providing lightning protection for a device for acquiring signals from a sensor, the device comprising a first line and a second line, each for connection to a respective output of the sensor, two bias resistors for biasing the measurement device and two lightning limiter components connected respectively to the first line and to the second line, and a common mode and differential mode filter circuit connected to the first line and to the second line. The method comprises the steps of:

- instead of and replacing a conventional differential amplifier, using a differential amplifier of "high common mode range" type, connecting a first input of the differential amplifier to the first line and a second input to the second line; and
- dimensioning the limiter components to reduce a lightning voltage to a maximum voltage value of about one hundred to three hundred volts, and dimensioning the filter circuit and the bias resistors to withstand that maximum voltage value.

Naturally, the invention is not limited to the embodiments described and covers any variant coming within the ambit of the invention as defined by the claims.

In particular, so long as it satisfies the definition given in the claims, the device may present differences compared with the device described, e.g. concerning the number of components.

It is possible to select components to have any maximum voltage after limiting that lies approximately in the range approximately 100 volts to approximately 300 volts. The maximum voltage may lie in the range 150 volts to 200 volts, or it may be equal to approximately 200 volts.

The invention claimed is:

1. A device for acquiring signals from a sensor, the device comprising:
   - a differential amplifier having a first input connected to a first line and a second input connected to a second line, the first line and the second line each being for connection to a respective output of the sensor;
   - two bias resistors for biasing the device and connected respectively to the first line and to the second line;
   - a common mode and differential mode filter circuit connected to the first line and to the second line; and
   - two lightning limiter components connected respectively to the first line and to the second line;

wherein the differential amplifier is a high common mode range type differential amplifier, in that the limiter components are dimensioned to reduce a lightning voltage to a maximum voltage value of about one hundred to three hundred volts, and in that the filter circuit and the bias resistors are dimensioned to withstand the maximum voltage value.

2. The device according to claim 1, wherein the filter circuit comprises:
   on each of the first line and the second line, a first resistor connected firstly to the differential amplifier and secondly a second resistor that is connected to a respective input of the device;
   a first capacitor connecting the first line to the second line between the first resistor and the differential amplifier; and
   a second capacitor having a first terminal connected to the first line between the first resistor and the second resistor and a second terminal connected to a first terminal of a third capacitor having a second terminal connected to the second line between the first resistor and the second resistor, the second terminal of the second capacitor and the first terminal of the third capacitor being connected to ground.

3. The device according to claim 1, wherein the maximum voltage lies in the range approximately 150 volts to approximately 200 volts.

4. The device according to claim 3, wherein the maximum voltage is approximately 200 volts.

5. A method of providing lightning protection for a device for acquiring signals from a sensor, the device comprising a first line and a second line, each for connection to a respective output of the sensor, two bias resistors for biasing the device and two lightning limiter components connected respectively to the first line and to the second line, and a common mode and differential mode filter circuit connected to the first line and to the second line, wherein the method comprises the steps of:
   using a high common mode range differential amplifier, connecting a first input of the differential amplifier to the first line and a second input to the second line; and
   dimensioning the limiter components to reduce a lightning voltage to a maximum voltage value of about one hundred to three hundred volts, and dimensioning the filter circuit and the bias resistors to withstand that maximum voltage value.

6. The method according to claim 5, wherein the maximum voltage lies in the range approximately 150 volts to approximately 200 volts.

7. The method according to claim 6, wherein the maximum voltage is approximately 200 volts.

\* \* \* \* \*